United States Patent
Grossmith

(10) Patent No.: US 8,162,376 B1
(45) Date of Patent: Apr. 24, 2012

(54) AUTOMATED SUN VISOR FOR VEHICLES

(76) Inventor: Geoffrey J. Grossmith, Toronto (CA)

( * ) Notice: Subject to any disclaimer, the term of this patent is extended or adjusted under 35 U.S.C. 154(b) by 0 days.

(21) Appl. No.: 12/986,693

(22) Filed: Jan. 7, 2011

Related U.S. Application Data

(60) Provisional application No. 61/292,999, filed on Jan. 7, 2010.

(51) Int. Cl.
*B60J 7/00* (2006.01)
(52) U.S. Cl. ............... 296/97.8; 296/97.4; 296/97.11
(58) Field of Classification Search ............ 296/97.8, 296/97.4, 97.9, 97.11
See application file for complete search history.

(56) References Cited

U.S. PATENT DOCUMENTS

| | | | |
|---|---|---|---|
| 3,226,151 A | 12/1965 | Reuther | |
| 3,343,868 A | 9/1967 | Manookian, Jr. | |
| 4,178,035 A | 12/1979 | Cziptschirsch | |
| 4,468,062 A | 8/1984 | Marcus et al. | |
| 4,874,938 A | 10/1989 | Chuang | |
| 4,902,062 A | 2/1990 | Pusic et al. | |
| 4,919,468 A | 4/1990 | Abu-Shumays et al. | |
| 4,988,139 A * | 1/1991 | Yamada | 296/97.2 |
| 5,244,244 A | 9/1993 | Gute et al. | |
| 5,292,168 A * | 3/1994 | Mykytiuk et al. | 296/97.8 |
| 5,298,732 A | 3/1994 | Chen | |
| 5,873,621 A | 2/1999 | Kuighadush et al. | |
| 5,947,544 A | 9/1999 | Hubeshi | |
| 6,318,788 B1 | 11/2001 | Jaurigue | |
| 6,811,201 B2 | 11/2004 | Naik | |
| 2007/0222252 A1 | 9/2007 | Suzuki et al. | |

\* cited by examiner

*Primary Examiner* — Joseph Pape
(74) *Attorney, Agent, or Firm* — Montgomery Patent & Design, LLC; Robert C. Montgomery; Joseph T. Yaksich

(57) ABSTRACT

An electrically-deployable sun visor system for use on motor vehicles wherein the sun visor retracts upward and deploys downward upon a track system, are located on the front windshield and alternately on the side window. The sun visor is operated by a motor-operated gear system wired into the electrical system of the motor vehicle. The sun visor is operated by a dash-mounted switch. The amount of deployment is controlled by holding the switch in either an up or down position for the necessary period of time similar to an electrically operated window.

10 Claims, 6 Drawing Sheets

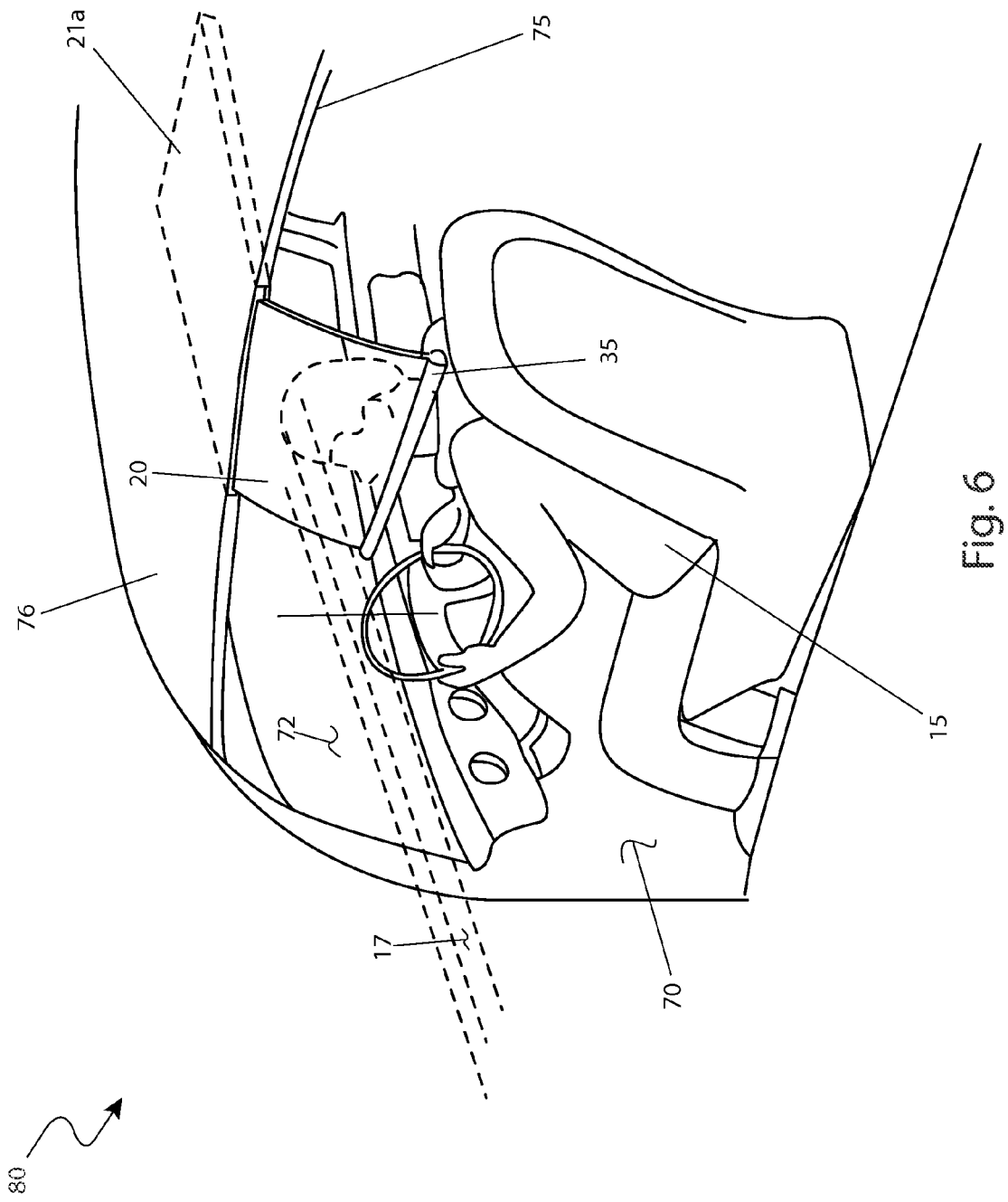

AUTOMATED SUN VISOR FOR VEHICLES

RELATED APPLICATIONS

The present invention was first described in and claims the benefit of U.S. Provisional Application No. 61/292,999 filed Jan. 7, 2010, the entire disclosures of which are incorporated herein by reference.

FIELD OF THE INVENTION

The present invention relates generally to deployable automobile sun visors, and in particular, to a motorized deployable automobile sun visor with an electronic control.

BACKGROUND OF THE INVENTION

Bright sunlight is a prominent cause of poor visibility, distraction, and discomfort when driving an automobile. In a case where a driver is forced to drive towards the sun, particularly during sunny periods and periods where the sun is low in the sky, bright sunlight is directly incident upon the driver's field of vision. This causes discomfort due to the high intensity of the light and decreased visibility when attempting to look in a direction near the sun.

A common solution to decrease direct incident sunlight and increase visibility during such conditions is the use of automobile sun visors. These visors commonly pivot downwardly from a front roof position of the automobile and provide an opaque shield to a top portion of the windshield while leaving the direct-forward view unhindered. In most cases, the sun is high enough in the sky that such visors block a significant portion of the incident rays.

However, use of such visors contributes to what is possibly the most significant safety concern in the field of automobiles—attempting to operate or focus on non-driving manual tasks while driving a vehicle. Such distractions are a leading cause of accidents and injuries. The deployment of a sun visor is such a distraction in and of itself; however, in particular, the adjustment of the visor once it is deployed is particularly troublesome. This is due to the fact that the driver generally must look directly at the visor in order to dislodge it and position it in a desired spot, thereby taking their eyes off of the road ahead for a period of time.

Various attempts have been made to provide automatic vehicle shade or visor assemblies. Examples of these attempts can be seen by reference to several U.S. patents, including U.S. Pat. No. 3,226,151; U.S. Pat. No. 3,343,868; U.S. Pat. No. 4,178,035; U.S. Pat. No. 4,468,062; U.S. Pat. No. 5,298,732; U.S. Pat. No. 5,873,621; and U.S. Pat. No. 6,318,788.

While these apparatuses fulfill their respective, particular objectives, each of these references suffer from one (1) or more of the aforementioned disadvantages. Many such apparatuses are not adapted for use with both a windshield and a side window portion of a vehicle. Also, many such apparatuses are not readily retrofittable to existing vehicles and require installation by the original manufacturer. Furthermore, many such apparatuses are not adjustable or movable once installed. In addition, many such apparatuses do not provide simple controls which can be selectively located by the driver for ease of access during driving. Accordingly, there exists a need for an automated sun visor for motor vehicles without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for an automated sun visor for a motor vehicle which is utilizable with existing vehicles in a variety of adjustable configurations to allow a user to safely and automatically provide sun protection while driving, according to their preference. Thus, the object of the present invention is to solve the aforementioned disadvantages and provide for this need.

To achieve the above objectives, it is an object of the present invention to provide an automated electrically deploying sun visor for a motor vehicle in order to reduce sun radiation through a windshield or window. The system comprises a housing enclosure, a motor, and a switch.

Another object of the present invention is to allow a user to retrofit the system to an existing vehicle. The system can also be incorporated into the original equipment of a desired vehicle during manufacturing.

Yet still another object of the present invention is to replace a conventional sun visor on a driver side portion of a desired vehicle. The system is installed adjacent to the front windshield on an interior portion of the vehicle between a head liner and the roof of the vehicle. In this position, the system also provides shade to a steering wheel to prevent excessive heating of the steering wheel while driving.

Yet still another object of the present invention is to provide unobtrusive and customizable positioning of the housing enclosure within a motor vehicle. The housing enclosure comprises a flat generally rectangular structure which is attachable to an underside of the roof, preferably with a plurality of threaded studs and nuts. The studs can be installed in a desired position and orientation along the roof so as to retain the housing enclosure flush against the roof and minimize the amount of space disrupted by the system.

Yet still another object of the present invention is to provide a shading visor extendable from within the housing enclosure. The visor is constructed of a semi-rigid plastic which provides slight flexibility and allows the visor to conform to the profile of a windshield or window during deployment.

Yet still another object of the present invention is to enable the visor to move smoothly along the windshield or window during deployment by providing a slightly rounded front edge. This front edge also inhibits the visor from retracting entirely within the housing enclosure.

Yet still another object of the present invention is to provide even, secure, and controlled motorized motioning of the visor using the motor, a pair of gears, and a plurality of guiding pins within the enclosure. When the motor is actuated, it motions the gears which engage a corresponding toothed exterior track integrally molded within the visor. The visor is secured in a vertical position by the pins to prevent disruptive motion of the visor within the enclosure.

Yet still another object of the present invention is to allow a user to deploy or retract the visor in an electronically controlled manner using a microprocessor control unit located adjacent to the housing enclosure.

Yet still another object of the present invention is to allow a user to relay control signals to the control unit using a bi-directional switch. The switch can be installed in a desired location along a dashboard, a steering wheel, a door panel, or the like to facilitate safe use by a driver while operating a vehicle. The switch and control unit are interconnected to the vehicle's wiring harness with an appropriately gauged electrical wiring.

Yet still another object of the present invention is to allow a user to position the housing enclosure in such a manner that deployment of the visor provides shade within a side window of the vehicle.

Yet still another object of the present invention is to provide a method of utilizing the device that provides a unique means of acquiring the system; if retrofitting the system, removing the existing sun visors from the drivers-side portion in a desired vehicle, removing the head liner, installing the studs to the roof, fastening the housing enclosure to the studs with the nuts, and installing the switch to a desired location; routing electrical wiring from the control unit to the switch and to the vehicles wiring harness; depressing the switch to extend or retract the visor; repeating the abovementioned process to install the system on various locations in the vehicle; and, enjoying glare free driving in vehicles.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
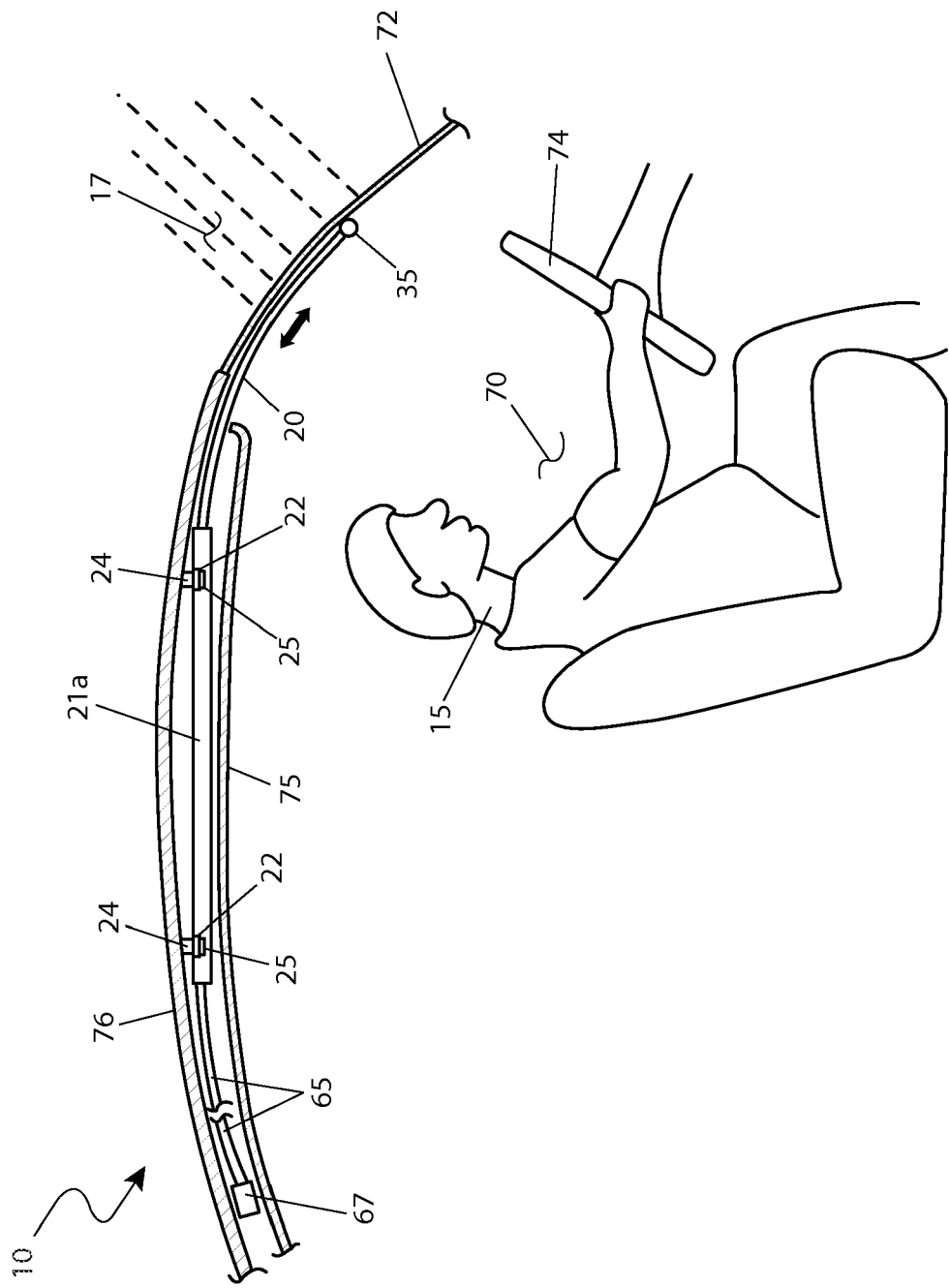
FIG. 1 is an environmental fragmental view of an automated sun visor for a motor vehicle 10 depicting an active state within a vehicle, according to a preferred embodiment of the present invention.

DESCRIPTIVE KEY 10 automated sun visor for a motor vehicle
15 driver
17 sun radiation
20 visor
21a housing enclosure
21b upper panel
21c side panel
21d rear panel
21e front panel
21f opening
21g bottom panel
22 ear
23 aperture
24 stud
25 nut
30 track
35 visor front edge
50 motor
51 shaft
52 side groove
53 gear
54 intermediate pin
55 rear pin
60 switch
65 electrical wiring
67 control unit
70 driver-side portion
71 side window
72 front windshield
74 steering wheel
75 head liner
76 roof
78 dashboard
80 alternate embodiment

DETAILED DESCRIPTION OF THE PREFERRED EMBODIMENT

The best mode for carrying out the invention is presented in terms of its preferred embodiment, herein depicted within FIGS. 1 through 5 and alternately within FIG. 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an automated sun visor for a motor vehicle (herein described as the "system") 10, which provides a means for electrically deploying at least one (1) sun visor 20 in a vehicle. The system 10 is preferably a part of the original equipment of a desired vehicle, yet may also be retrofitted without limiting the scope of said system 10. The system 10 is preferably utilized on the driver-side portion 70 in the vehicle to reduce sun radiation 17 from the front windshield 72 in a simple but high-tech manner for the safety of not just the driver 15 of a motor vehicle but all surrounding motorists and pedestrians as well. The system 10 may also be installed in various other positions within the vehicle such as the side window 71 (see FIG. 6) or the like.

Referring now to FIG. 1, an environmental view of the system 10 depicting an active state within a vehicle, according to the preferred embodiment of the present invention, is disclosed. The system 10 replaces a conventional sun visor utilized on the driver side portion 70 of the desired vehicle. The system 10 is installed adjacent to the front windshield 72 on an interior portion of the vehicle particularly between the head liner 75 and the roof 76. During the original equipment manufacturing process of the vehicle an opening should be left vacant between the head liner 75 and the roof 76 nearest to the windshield 72 to enable the visor 20 to freely deploy and retract. The system 10 comprises a housing enclosure 21a, a motor 50, and a switch 60, and other mechanical and electrical components as mentioned herein below. The system 10 is preferably installed above the front windshield 72 to eliminate sun radiation 17 which is directed to the driver 15 in multiple directions during driving. The visor 20 reduces the sun radiation 17 from the driver 15 by blocking a portion of the windshield 72 similar to conventional vehicle sun visors, yet in an electrically deployable manner. The visor 20 also reduces the steering wheel 74 from becoming overly heated by reducing sun radiation 17 from coming in contact with said steering wheel 74. The visor 20 is fabricated from a semi-rigid plastic and made available in a variety of colors and designs to complement the existing vehicle interior.

Figure 2:
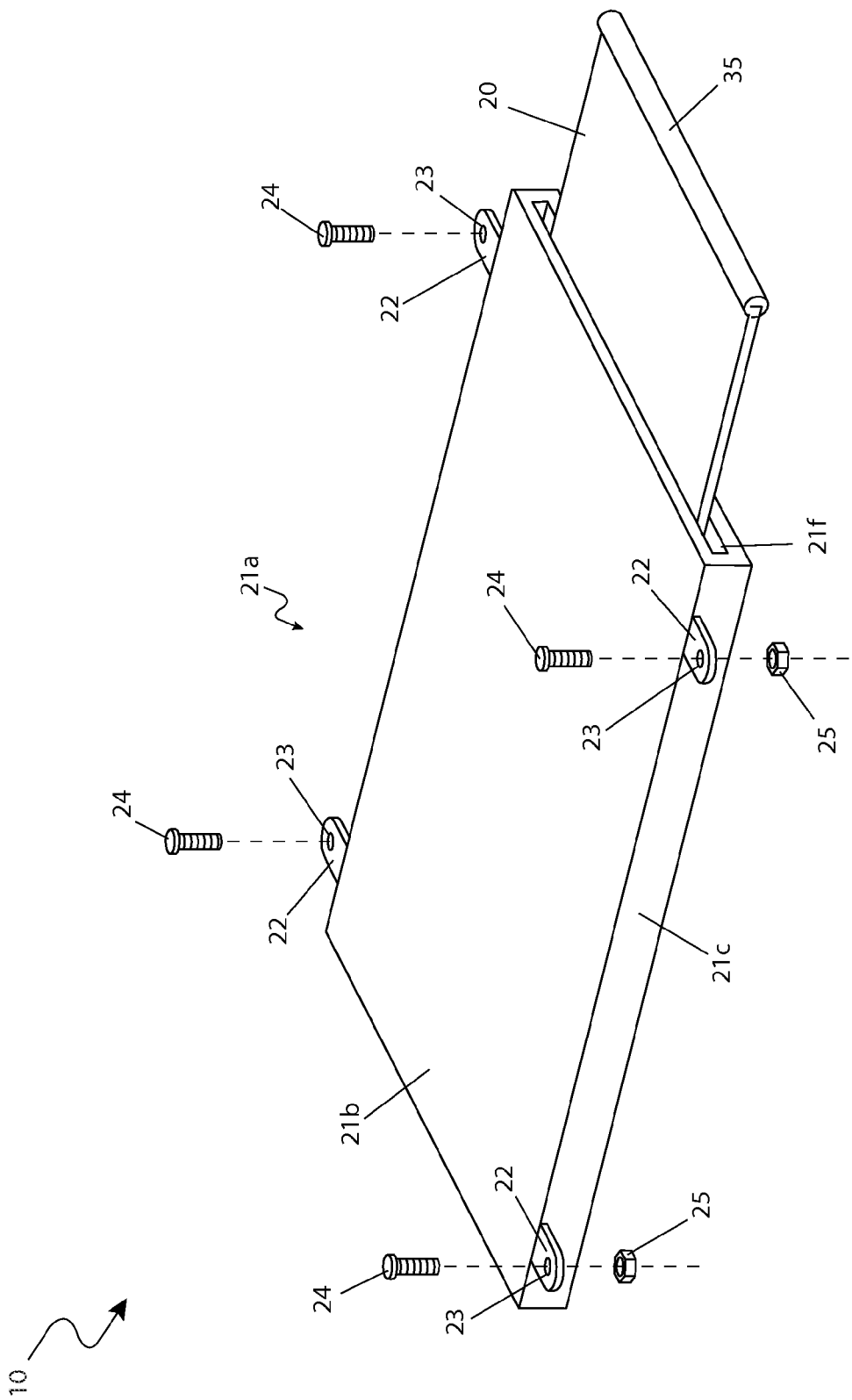
FIG. 2 is a perspective view of the automated sun visor for a motor vehicle 10 depicting a slightly deployed state, according to a preferred embodiment of the present invention.

Referring now to FIG. 2, a perspective view of the system 10 depicting a slightly deployed state, according to the preferred embodiment of the present invention, is disclosed. The housing enclosure 21a comprises a six-sided rectangular shape further including an upper panel 21b, a pair of side panels 21c, a rear panel 21d, a front panel 21e, and a bottom panel 21g. The housing enclosure 21a is fabricated from materials such as metal or plastic. The housing enclosure 21 is preferably manufactured in various dimensions to accommodate various vehicles. Each opposing longitudinal perimeter edge of the side panels 21c comprises a pair of ears 22 which are utilized to secure said housing enclosure 21 to an underside surface of the roof 76, above the head liner 75. Threaded studs 24 are attached to the underside surface of the roof 76 by common welding techniques and align with an aperture 23 located on each ear 22. Each stud 24 is inserted into each aperture 23 and a common nut 25 secures to said stud 24 to further secure the housing enclosure 21 to a fixed position. Other attachment means may also be utilized without limiting the scope of the system 10.

Figure 3:
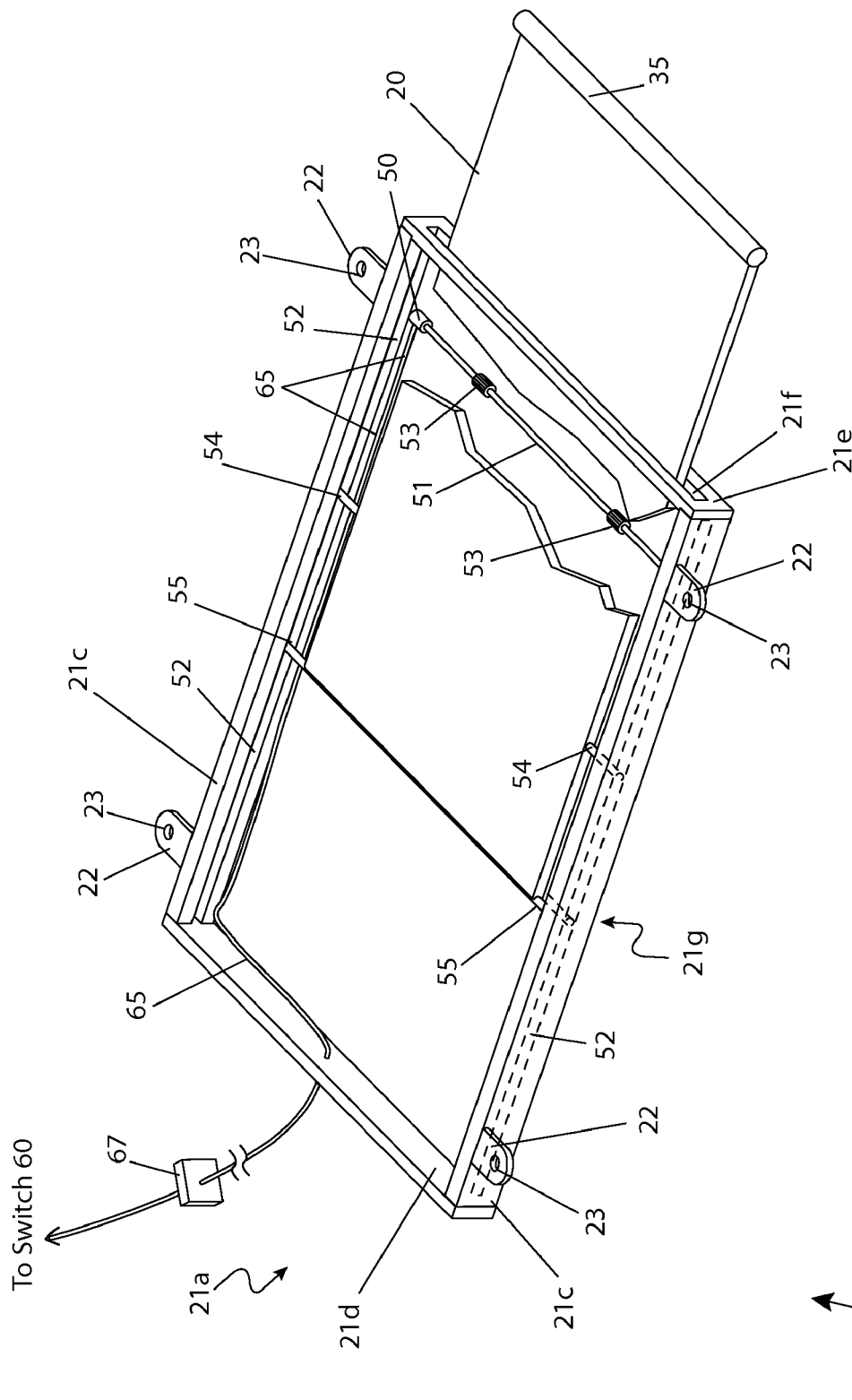
FIG. 3 is another perspective view of the automated sun visor for a motor vehicle 10 depicting a removed upper panel and a slightly deployed state, according to a preferred embodiment of the present invention.
Figure 4:
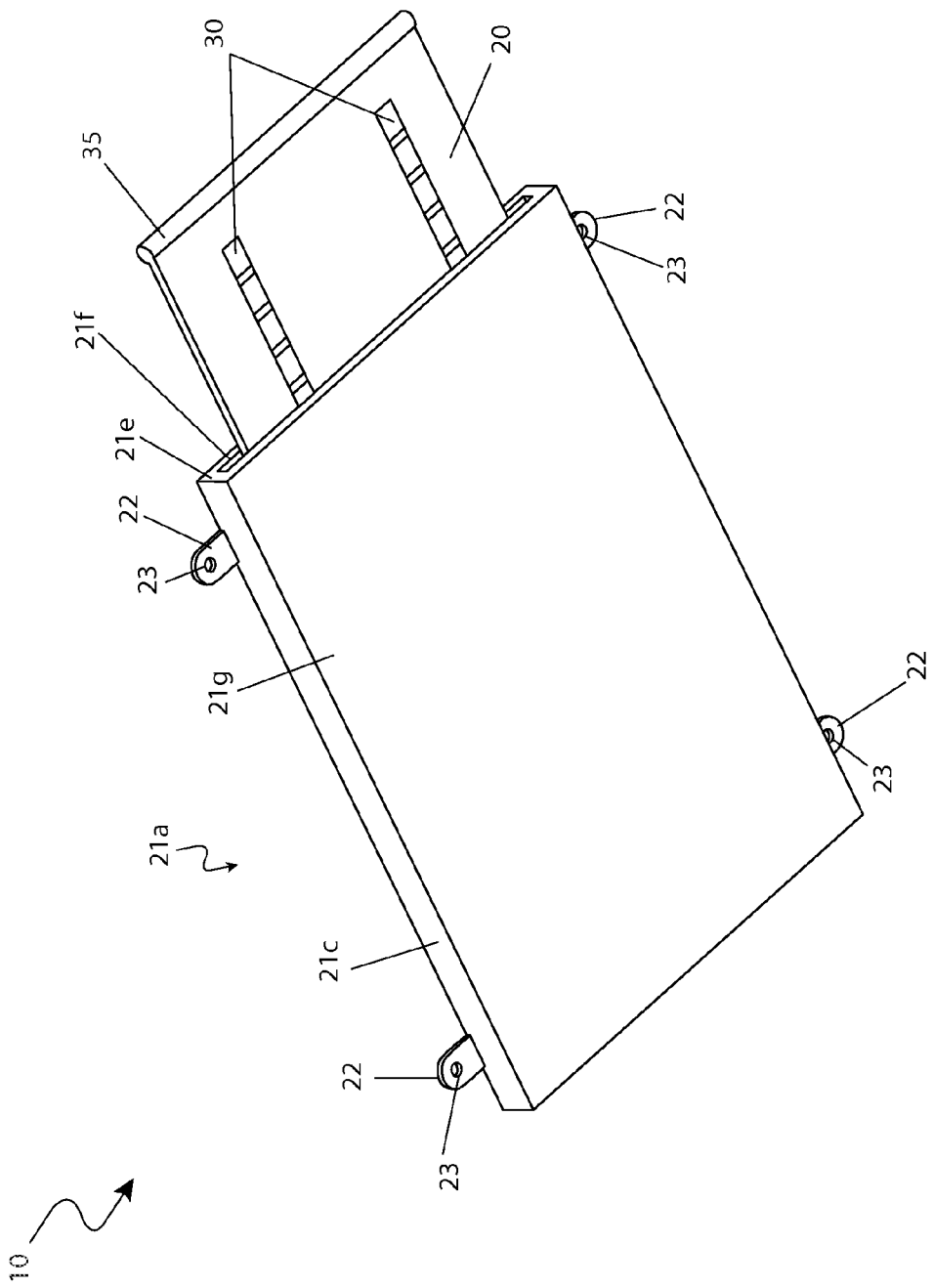
FIG. 4 is a bottom perspective view of the automated sun visor for a motor vehicle 10 depicting a slightly deployed state, according to a preferred embodiment of the present invention.

Referring now to FIG. 3, another perspective view of the system 10 depicting a removed upper panel and a slightly deployed state and FIG. 4, a bottom perspective view of the system 10 depicting a slightly deployed state, according to the preferred embodiment of the present invention, are disclosed. Internally, the housing enclosure 21a comprises the visor 20, a motor 50, a shaft 51, and a pair of gears 53. A portion of the visor 20 is depicted as being cut-away for illustration purposes only. The visor 20 is fabricated from a semi-rigid plastic material with shading or shielding characteristics as abovementioned which provides a flexibility to conform to the shape of the windshield 72 when deployed. The visor 20 is preferably a length similar to the housing enclosure 21a and a width slightly smaller than said housing enclosure 21a. The visor 20 is deployed from an opening 21f on the front panel 21e of the housing enclosure 21a which comprises dimensions slightly larger than the dimensions of the visor 20. A proximal perimeter edge of the visor 20 comprises a visor front edge 35 which enables said visor 20 to move smoothly with the curvature of the front windshield 72. The visor front edge 35 is integral to the visor 20 and comprises a slightly rounded shape which also prohibits the visor 20 from being retracted completely within the housing enclosure 21a due to the fact that the visor front edge 35 is slightly larger than the opening 21f.

Each opposing intermediate perimeter edges and the distal perimeter edge of the visor 20 comprises an intermediate pin 54 and a rear pin 55, respectively which are integral to said visor 20. The rear pin 55 spans an entire rear edge of the visor 20. The pins 54, 55 engage a side groove 52 which is located on an inner surface of each side panel 21c to enable the visor 20 to be retracted and deployed in an even and secured manner. The intermediate pins 54 also prohibit the visor 20 from coming completely deployed from the housing enclosure 21a because said intermediate pins 54 come in contact with a rear portion of the opening 21f upon the front panel 21e.

The motor 50 and the pair of gears 53 are oriented below a proximal portion of the visor 20 and are secured about a shaft 51 mounted to interior surfaces of said pair of side panels 21c. The motor 50 is comprised of a conventional direct current (DC) motor, yet other similar devices may be utilized without limiting the scope of the system 10. The gears 53 comprise a toothed exterior surface which engages a corresponding toothed track 30. The track 30 is located on an underside surface of the visor 20 and is integrally molded into said visor 20. The motor 50 rotates the shaft 54 which concurrently rotates each gear 53 to retract or deploy the visor 20 wherein the intermediate pins 54 and rear pin 55 slide laterally within the side grooves 52. The visor 20, motor 50, and gears 53 are interconnected via electrical wiring 65 to a switch 60 and a control unit 67 which enables the driver 15 to deploy or retract said visor 20 as necessary. The control unit 67 is depicted within FIG. 1 as being located between the head liner 75 and the roof 76, yet other locations may be utilized without limiting the scope of the system 10. The control unit 67 is comprised of a microprocessor or the like and other similar electronics that will relay the state of the switch 60 (see FIG. 5) to the motor 50 to correspondingly retract or deploy the visor 20 from the housing enclosure 21a.

Figure 5:
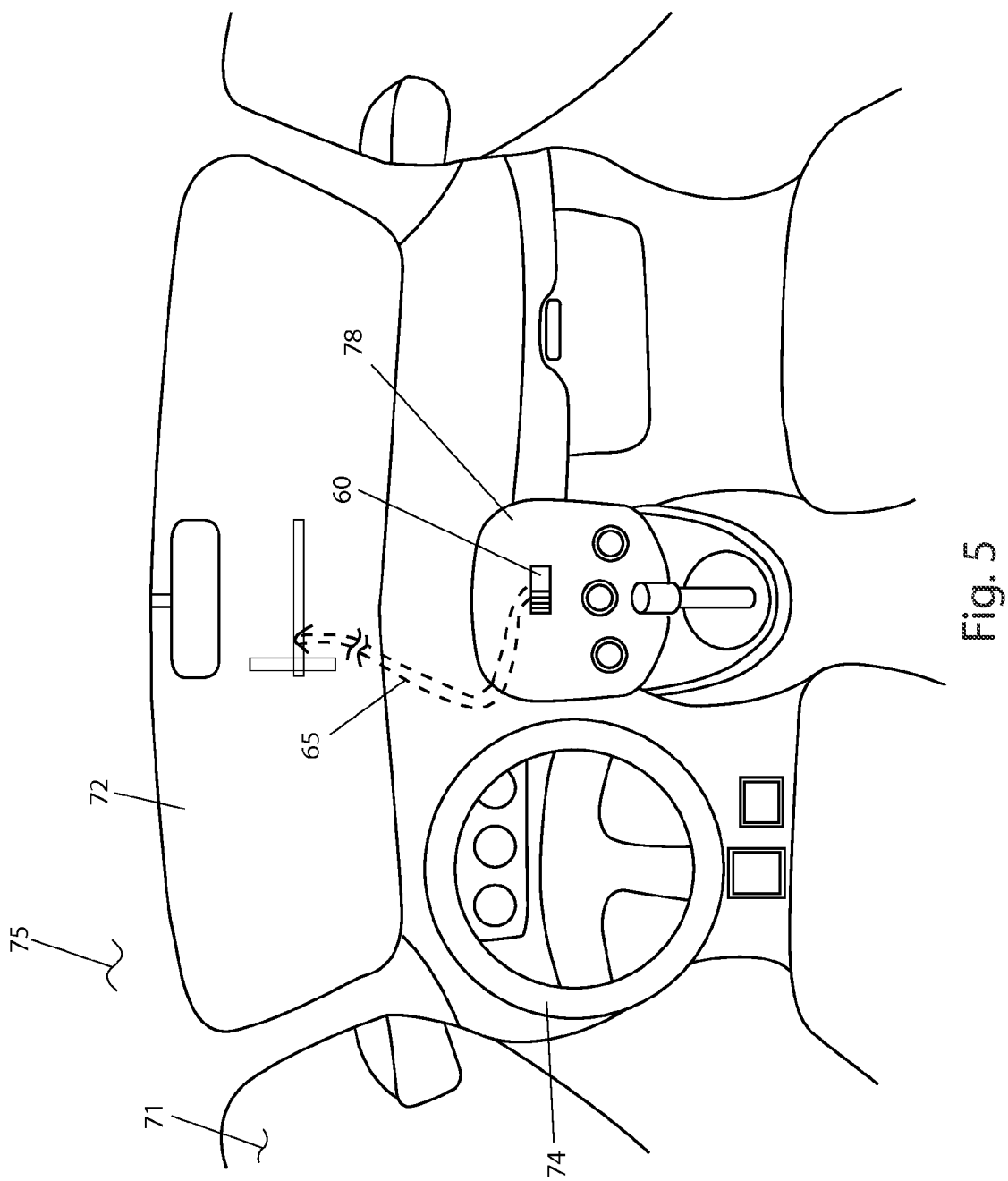
FIG. 5 is an environmental view of a vehicle interior, according to a preferred embodiment of the present invention; and, FIG. 6 is an environmental view of an alternate embodiment 80 positioned about a side window 71 and depicting an active state within a vehicle, according to an alternate embodiment of the present invention.

Referring now to FIG. 5, an environmental view of a vehicle interior, according to the preferred embodiment of the present invention, is disclosed. The switch 60 is preferably located on the dashboard 78 of the vehicle, yet other positions may be utilized such as, but not limited to: the steering wheel 74, the door panel, or the like. The switch 60 is interconnected to the motor 50 and control unit 67 as abovementioned, yet is also routed to the vehicles wiring harness via appropriately gauged electrical wiring 65 to supply the system 10 with power. The switch 60 is comprised of a conventional single pole double throw switch, yet other switching devices may be utilized such as, but not limited to: a toggle switch, a pushbutton, or the like. The switch 60, in use, is depressed in one (1) direction to deploy the visor 20 to a desired length and may depressed in an opposing direction to retract said visor 20. In a retrofit embodiment the switch 60 would be attached to a desired area upon the dashboard 78 with attachment means such as, but not limited to: mechanical fasteners, adhesives, or the like.

Referring now to FIG. 6, an environmental view of an alternate embodiment 80 positioned about a side window 71 and depicting an active state within a vehicle, according to the alternate embodiment of the present invention, is disclosed. As abovementioned the system 10 may alternately be utilized for a side window 71 particularly on the driver-side portion 70. The alternate embodiment 80 would block sun radiation 17 from the driver 15 upon a side orientation. The alternate embodiment 80 is preferably original equipment to the vehicle, yet may also be retrofitted to a desired vehicle without limiting the scope of the system 10. To be arranged for utilization on the side window 71, the system 10 is turned ninety degrees (90°) with the front panel 21e toward said side window 71. Internally, the system 10 would remain as abovementioned and the switch 60 may also remain upon the dashboard 78.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 1.

The method of utilizing the system 10 as an original equipment embodiment may be achieved by performing the following steps: acquiring the system 10; depressing the switch 60 to send a signal to the control unit 67 to activate the motor 50, rotating the shaft 51 and gears 53 which engage the tracks 30 to extend the visor 20 to a desired length to block sun radiation 17 from the driver 15 on the front windshield 72; depressing the switch 60 in an opposite direction to retract the visor 20 to an original state; and, enjoying glare free driving in vehicles.

The method of utilizing the system 10 as a retrofit may be achieved by performing the following steps: acquiring the system 10; removing the existing sun visors from the drivers-side portion 70 in a desired vehicle; removing the head liner 75; installing the studs 24 to the roof 76; fastening the housing enclosure 21a to the studs 24 with the nuts 25 with the front panel 21e toward the front windshield 72; altering the head liner 75 to enable the visor 20 to retract and deploy in an expected manner; reinstalling the head liner 75; installing the switch 60 to a desired location; routing electrical wiring 65 from the control unit 67 to the switch 60 and to the vehicles wiring harness; repeating the abovementioned process to install the system 10 on various locations in the vehicle; depressing the switch 60 to extend the visor 20 to a desired length; depressing the switch 60 in an opposite direction to retract the visor 20 to an original state; and, enjoying glare free driving in vehicles.

The alternate embodiment 80 of the present invention can be utilized by the common user in a simple and effortless manner with little or no training. After initial purchase or acquisition of the system 10, it would be installed as indicated in FIG. 6.

The method of utilizing the alternate embodiment 80 as original equipment may be achieved by performing the following steps: acquiring the alternate embodiment 80; depressing the switch 60 to send a signal to the control unit 67 to activate the motor 50, rotating the shaft 51 and gears 53 which engage the tracks 30 to extend the visor 20 to a desired length to block sun radiation 17 from the driver 15 on the side window 71; depressing the switch 60 in an opposite direction to retract the visor 20 to an original state; and, enjoying glare free driving in vehicles.

The method of utilizing the alternate embodiment 80 as a retrofit may be achieved by performing the following steps: acquiring the alternate embodiment 80; removing the existing sun visors from the drivers-side portion 70 in a desired vehicle; removing the head liner 75; installing the studs 24 to the roof 76; fastening the housing enclosure 21a to the studs 24 with the nuts 25 with the front panel 21e toward the front windshield 72; altering the head liner 75 to enable the visor 20 to retract and deploy in an expected manner; reinstalling the head liner 75; installing the switch 60 to a desired location; routing electrical wiring 65 from the control unit 67 to the switch 60 and to the vehicles wiring harness; repeating the abovementioned process to install the alternate embodiment 80 on various locations in the vehicle; depressing the switch 60 to extend the visor 20 to a desired length; depressing the switch 60 in an opposite direction to retract the visor 20 to an original state; and, enjoying glare free driving in vehicles.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An automated sun visor adaptable to be attached to a motor vehicle, comprising:
   a housing enclosure, further comprising:
      a generally rectangular structure having a six-sided enclosure including an upper panel, a pair of side panels, a rear panel, a front panel, a bottom panel thereby defining an interior;
      a pair of ears on opposing perimeter edges of each of said pair of side panels;
      a pair of grooves each located along an opposing interior inner surface of each of said side panels and extending an entire length thereof; and,
      an opening located at said front panel;
   a mounting means for removably mounting said housing enclosure to an interior of said motor vehicle between a head liner and a roof;
   a sun visor operably disposed within said interior of said housing enclosure, further comprising:
      a semi-rigid plastic body comprising a width not greater than a width of said opening;
      a pair of opposing intermediate pins extending perpendicularly outward from intermediate locations of a side of said body;
      a rear pin spanning an entire rear perimeter edge of said body and extending outwardly parallel with said pair of intermediate pins;
      a visor front edge comprising a slightly rounded shape having a diameter greater than a height of said opening and spanning an entire front perimeter edge of said body; and,
      a pair of toothed tracks located on an underside surface of said sun visor and running parallel between said visor front edge and said rear pin; and
   an automated control mechanism operably driving said sun visor relative to said housing and in electrical communication with an on-board power source of said motor vehicle;
   wherein said housing enclosure is removably attached by inserting said mounting means through each of said ears;
   wherein said sun visor is selectably and incrementally maneuvered between a fully deployed position and a fully retracted position;
   wherein said automated control mechanism operably drives said sun visor through said opening to a desired position between said fully retracted position and said fully deployed position;
   wherein said pair of intermediate pins travel within said pair of grooves when acted upon by said automated control mechanism;
   wherein said rear pin travels within said pair of grooves when acted upon by said automated control mechanism;
   wherein said pair of intermediate pins are retained within said housing enclosure when said sun visor is in said fully deployed position;
   wherein said visor front edge prohibits said sun visor from being fully retracted within said interior of said housing enclosure at said fully retracted position.

2. The automated sun visor of claim 1, wherein said automated control mechanism further comprises:
- a motor mounted to an inner surface of said bottom panel of said housing enclosure subjacent to said sun visor;
- a motor shaft operably driven by said motor and spanning a width of said interior of said housing enclosure;
- a pair of toothed gears secured about and operably driven by said motor shaft; and,
- a control assembly in electrical communication with said motor and said on-board power source;
- wherein said control assembly controls said motor such that said motor drives said motor shaft
- wherein said motor shaft drives said pair of toothed gears;
- wherein said pair of toothed gears engages said pair of toothed tracks of said sun visor to operably drive said sun visor.

3. The automated sun visor of claim 2, wherein said control assembly further comprises:
- a switch in electrical communication with said on-board power source;
- a control unit comprising a microprocessor mounted adjacent to said housing enclosure and in electrical communication with said motor and said switch;
- wherein said switch is selectively positioned to generate a control command to operably drive said sun visor between said fully retracted position and said fully deployed position; and,
- wherein said control unit relays said control command to said motor.

4. The automated sun visor of claim 3, wherein said switch is mounted within a dashboard of said motor vehicle.

5. The automated sun visor of claim 4, further comprising an attachment location directly above an operator of said motor vehicle adjacent to a front windshield and oriented so that said visor opening is directed towards said windshield and said sun visor is deployed to cover said windshield.

6. An automated sun visor adaptable to be attached to a motor vehicle, comprising:
- a housing enclosure, further comprising:
  - a generally rectangular structure having a six-sided enclosure including an upper panel, a pair of side panels, a rear panel, a front panel, a bottom panel thereby defining an interior;
  - a pair of grooves each located along an opposing interior inner surface of each of said side panels and extending an entire length thereof; and,
  - an opening located at said front panel;
- a pair of ears on opposing perimeter edges of each of said pair of side panels; and,
- a mounting fastener adapted to be affixed to an underside of a roof of an interior of said motor vehicle and routed through an aperture of each of said pair of ears to removably mount said housing enclosure between a head liner and a roof;
- a sun visor operably disposed within said interior of said housing enclosure, further comprising:
  - a semi-rigid plastic body comprising a width not greater than a width of said opening;
  - a pair of opposing intermediate pins extending perpendicularly outward from intermediate locations of a side of said body;
  - a rear pin spanning an entire rear perimeter edge of said body and extending outwardly parallel with said pair of intermediate pins;
  - a visor front edge comprising a slightly rounded shape having a diameter greater than a height of said opening and spanning an entire front perimeter edge of said body; and,
  - a pair of toothed tracks located on an underside surface of said sun visor and running parallel between said visor front edge and said rear pin;
- an automated control mechanism operably driving said sun visor relative to said housing and in electrical communication with an on-board power source of said motor vehicle;
- wherein said sun visor is selectably and incrementally maneuvered between a fully deployed position and a fully retracted position;
- wherein said automated control mechanism operably drives said sun visor through said opening to a desired position between said fully retracted position and said fully deployed position;
- wherein said pair of intermediate pins travel within said pair of grooves when acted upon by said automated control mechanism;
- wherein said rear pin travels within said pair of grooves when acted upon by said automated control mechanism;
- wherein said pair of intermediate pins are retained within said housing enclosure when said sun visor is in said fully deployed position;
- wherein said visor front edge prohibits said sun visor from being fully retracted within said interior of said housing enclosure at said fully retracted position.

7. The automated sun visor of claim 6, wherein said automated control mechanism further comprises:
- a motor mounted to an inner surface of said bottom panel of said housing enclosure subjacent to said sun visor;
- a motor shaft operably driven by said motor and spanning a width of said interior of said housing enclosure;
- a pair of toothed gears secured about and operably driven by said motor shaft; and,
- a control assembly in electrical communication with said motor and said on-board power source;
- wherein said control assembly said motor such that said motor drives said motor shaft;
- wherein said motor shaft drives said pair of toothed gears;
- wherein said pair of toothed gears engages said pair of toothed tracks of said sun visor to operably drive said sun visor.

8. The automated sun visor of claim 7, wherein said control assembly further comprises:
- a switch in electrical communication with said on-board power source;
- a control unit comprising a microprocessor mounted adjacent to said housing enclosure and in electrical communication with said motor and said switch;
- wherein said switch is selectively positioned to generate a control command to operably drive said sun visor between said fully retracted position and said fully deployed position; and,
- wherein said control unit relays said control command to said motor.

9. The automated sun visor of claim 8, wherein said switch is mounted within a dashboard of said motor vehicle.

10. The automated sun visor of claim 9, further comprising an attachment location directly above an operator of said motor vehicle adjacent to a front windshield and oriented so that said visor opening is directed towards said windshield and said sun visor is deployed to cover said windshield.

* * * * *